(12) United States Patent
Hajjar et al.

(10) Patent No.: US 6,544,716 B1
(45) Date of Patent: Apr. 8, 2003

(54) MULTILAYER OPTICAL MEDIUM FOR NEAR-FIELD OPTICAL RECORDING AND READING

(75) Inventors: Roger Hajjar, Santa Clara, CA (US); Sanjai Parthasarathi, San Jose, CA (US); Lu Cheng, Sunnyvale, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/100,369

(22) Filed: Jun. 19, 1998

(51) Int. Cl.$^7$ ................................. G11B 7/24
(52) U.S. Cl. ................ 430/271.1; 430/273.1; 430/275.1; 430/945; 369/275.5; 428/694 TP; 428/694 PR; 428/694 DE; 428/694 RL
(58) Field of Search .............. 430/270.13, 271.1, 430/273.1, 275.1, 900; 369/283, 275.5; 428/694 TP, 655, 694 TC, 694 PR, 694 DE, 694 RL

(56) References Cited

U.S. PATENT DOCUMENTS

| | | | | |
|---|---|---|---|---|
| 5,020,040 A | | 5/1991 | Lee ............................ 369/13 |
| 5,125,750 A | * | 6/1992 | Corle et al. ................. 359/819 |
| 5,225,926 A | | 7/1993 | Cuomo et al. .............. 428/408 |
| 5,255,260 A | * | 10/1993 | Yamada et al. ............. 369/199 |
| 5,397,644 A | | 3/1995 | Yamashita ................... 428/408 |
| 5,470,627 A | * | 11/1995 | Lee et al. .................... 428/64.4 |
| 5,497,359 A | * | 3/1996 | Mamin et al. .............. 369/44.15 |
| 5,510,186 A | | 4/1996 | Sulzbach ..................... 428/408 |
| 5,539,711 A | * | 7/1996 | Mitani ......................... 369/32 |
| 5,560,998 A | * | 10/1996 | Oyamatsu et al. ...... 428/694 DE |
| 5,565,278 A | * | 10/1996 | Birukawa et al. ....... 428/694 ML |
| 5,577,021 A | * | 11/1996 | Nakatani et al. .......... 369/275.2 |
| 5,604,003 A | * | 2/1997 | Coombs et al. ........... 430/270.13 |
| 5,609,948 A | | 3/1997 | David et al. ................. 428/408 |
| 5,633,746 A | * | 5/1997 | Sekija et al. ........... 428/694 RL |
| 5,656,370 A | * | 8/1997 | Murakami et al. ...... 428/694 RL |
| 5,712,833 A | * | 1/1998 | Ogihara et al. ........... 369/275.2 |
| 5,731,049 A | * | 3/1998 | Tailhades et al. ........... 427/597 |
| 5,904,819 A | * | 5/1999 | Abiko ......................... 430/945 |
| 5,948,496 A | * | 9/1999 | Kinoshita et al. ........... 430/945 |
| 6,009,064 A | * | 12/1999 | Hajjar ......................... 369/112 |
| 6,031,813 A | * | 2/2000 | Moriya et al. ............. 369/275.1 |
| 6,106,919 A | * | 8/2000 | Lee et al. .................... 428/64.1 |
| 6,124,017 A | * | 10/2000 | Hirata et al. ................ 428/64.1 |

FOREIGN PATENT DOCUMENTS

JP            09-044904        *  2/1997

OTHER PUBLICATIONS

Morishita et al., "Improvement in the erasability for PWM recording", Fifth phase–change recording symposium extended abstracts, pp. 92–95 Nov. 1993.*
"The Random House College Dictionary", Random House, Inc. pp. 370 and 839. (1973).*

* cited by examiner

Primary Examiner—Martin Angebranndt
(74) Attorney, Agent, or Firm—Fish & Richardson P.C.

(57) ABSTRACT

An electro-optical storage system based on an optical head and a multilayer storage medium in a near-field configuration. The heat generated by absorption of a read/write beam adversely affects the interfacing between the optical head and the medium. The medium has a thermal insulation dielectric layer and/or a heat-dissipating layer to reduce thermal feedback from the medium to the optical head.

11 Claims, 9 Drawing Sheets

MULTILAYER OPTICAL MEDIUM FOR NEAR-FIELD OPTICAL RECORDING AND READING

FIELD OF THE INVENTION

The present invention generally relates to optical recording and reading, and more particularly, to a near-field optical storage system and a multilayer optical medium.

BACKGROUND

Optical storage can be used to achieve high areal density data storage by using a tightly focused laser beam. For example, electro-optical data storage systems based on magneto-optical materials can be configured to produce an areal data density of up to or higher than about one gigabit per square inch. A monochromatic optical beam can be focused to a small spot by using an optical head with a large numerical aperture. This can produce a minimum spot size on the order of one wavelength due to the diffraction limit. The areal density of an optical storage device, in principle, is limited by this diffraction-limited spot size. The areal data density may be increased by reducing the spot size of a beam within the diffraction limit by using light sources of short wavelengths, such as lasers toward the blue end of the optical spectrum.

For a given wavelength, the area data density of an optical storage system can be increased by focusing an optical beam onto a flat surface of a solid transparent material with a high refractive index that is implemented in the optical head. The diffraction-limited focused spot size is hence reduced by a factor of the refractive index compared to the spot size in air.

In particular, a near-field configuration between the optical head and the optical medium may be formed by placing the optical head near the medium surface at a distance on the order of or less than one wavelength to effect evanescent optical coupling therebetween.

For example, the medium surface and the flat surface of the solid material may be typically spaced closer than one wavelength. U.S. Pat. No. 5,125,750 to Corle and Kino discloses a near-field optical recording system based on a solid immersion lens.

In a near-field configuration, the numerical aperture of the optical head can be greater than unity which is beyond the diffraction limit in air.

SUMMARY

The present invention is embedded in an electro-optical data storage system in a near-field configuration. This system includes an optical train which has an optical head for coupling optical energy to and from a recording layer in an optical storage medium. In a preferred embodiment, the optical head is spaced from the surface of the medium by an air gap typically less than one wavelength in thickness. Hence, the optical coupling between the optical head and the optical medium is effected by both the optical propagation and evanescent coupling through the air gap.

An optical beam from the optical head is focused onto the medium and causes localized heating at and near the focused spot. This localized heating can modify certain properties of the interface of the optical head and the optical medium and thereby can cause distortion in the received signals. This may adversely affect the performance of the system. The recognition of such a problem is one aspect of the invention.

Another aspect of the invention is a multilayer structure of the optical storage medium that reduces the adverse effects of the localized heating. The multiple layers are preferably configured to substantially confine the heat within or near the recording layer to reduce the temperature change at the surface of the medium close to the optical head.

In one embodiment, a special capping layer may be formed on the medium surface to thermally insulate the optical head and the medium. The capping layer may be formed of a thick and optically transparent material with a low thermal conductivity. This reduces the thermal feedback from the medium to the optical head caused by the localized heating. A material comprising at least one of a diamond-like-carbon material, silicon nitride, silicon dioxide and others, for example, can be used to form the capping layer.

In another embodiment, one or more heat-dissipating layers having high thermal conductivities may be used to reduce the amount of thermal energy conducted to the medium surface near the optical head. Such a heat-conducting layer may be formed in the medium either between the optical head and the recording layer or on the other side of the recording layer. When such a thermally conductive layer is formed between the interface and the recording layer, an optically transparent material, such as a layer of aluminum nitride, a thin transparent film of gold or silver, can be used.

In yet another embodiment, one or more capping layers may be combined with one or more heat-dissipating layers to further reduce the surface heating near the optical head.

These and other aspects and advantages of the present invention will become more apparent in light of the following detailed description, the accompanying drawings, and the appended claims.

DETAILED DESCRIPTION OF THE PREFERRED EMBODIMENTS

Figure 1:
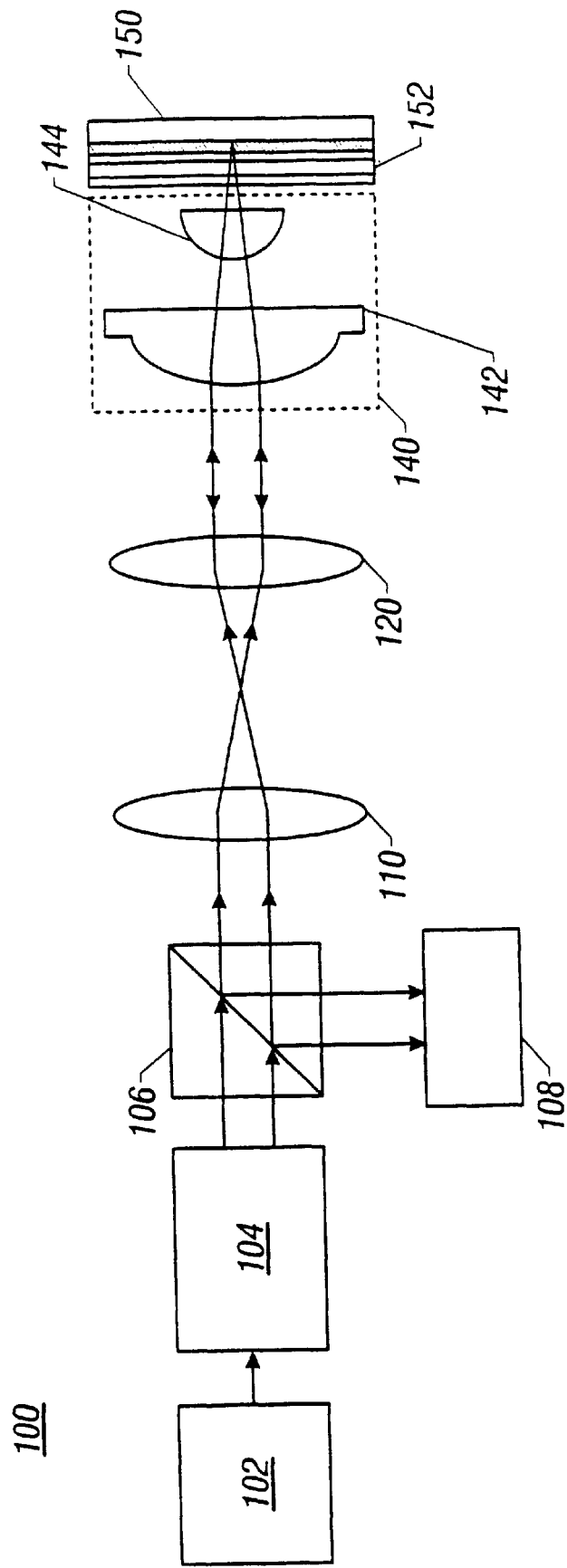
FIG. 1 is a schematic illustration of a simplified optical train of an optical storage system according to one embodiment of the invention.

FIG. 1 shows an optical train 100 of an optical storage system in accordance to an embodiment. A light source 102 such as a laser produces a beam at a specified wavelength for recording and retrieving data. An optical medium 150 (e.g., a disk) is configured to include a recording layer 152 (e.g., formed of a magneto-optical material or phase-changing material) for data storage. Data is spatially distributed and stored in the recording layer 152 by a suitable encoding method. Various encoding schemes are known in the art. The optical medium 150 may be a removable medium or a fixed medium which is held and supported by a medium holder.

An optical beam from the light source 102 is collimated by an optical collimator 104 and then projected to an optical head 140 by a relay lens 110 and an imaging lens 120. The optical head 140 has an objective lens 142 and a near-field lens 144 to couple the beam to the optical medium 150.

The near-field lens 144 is preferably made of a high-index optical material to produce a large effective numerical aperture ("NA"), i.e., NA=n sin $\theta_0$, where n is the refractive index of the near-field lens 144 and $\theta_0$ is the maximum ray angle from the lens 144 to the focus point. For example, a solid immersion lens ("SIL"), a graded index lens ("GRIN lens") or a "Gradium lens" may be used as the near field lens 144 to achieve an NA up to and greater than unity. FIG. 1 shows a hemispherical SIL as an example of the near-field lens 144.

The near-field lens 144 and the optical medium 150 are spaced from each other by an air gap less than one wavelength of the light produced by light source 102. This is known as a "near-field" configuration. Optical energy is coupled between the near-field lens 144 and the optical medium 150 by both light propagation and evanescent waves through the thin air gap therebetween. In a near-field optical disk drive, the optical head 140 can be made compact and light-weight so that it can be suspended over the optical medium 150 (i.e., an optical disk). In operation, the optical medium 150 is spinning and the optical head is floating over the disk at a height less than one wavelength (e.g., in a range from about 50 nm to about 200 nm).

A beam splitter 106 can be disposed to guide a reflected beam from the optical medium 150 to a detection module 108 which has detectors for both data extraction and beam tracking. The output beam from the light source 102 may be may be polarized and the beam splitter 106 may be a polarizing prism in order to direct nearly all reflected beam to the detection module 108 by using a polarization rotator (e.g., a quarter wave plate) between the beam splitter 106 and the optical medium 150).

Certain implementations of the optical train 100 in FIG. 1 and their operations are described in U.S. patent application Ser. No. 08/846,916, "Electro-optical storage system with flying head for near-field recording and reading", filed on Apr. 29, 1997, the entire disclosure of which is incorporated herein by reference to the extent necessary to proper understanding. Optical read/write systems are also described by Alan B. Marchant, in "Optical Recording," Addison-Wesley Publishing (1990).

An optical beam from the optical head 140 is focused onto the optical medium 150 and can cause localized heating at and near the focused spot. This localized heating can modify certain properties of the optical medium 150 and can be coupled to the optical head 140 through the thin air gap to modify the characteristics of the interfacing between the optical head 140 and the medium 150.

This heating causes distortion in the optical signal received by the optical head 140 and can degrade the performance of the system. In a near-field configuration, the distortion in the optical signals is specially significant since the spacing between optical head and the optical medium is small (i.e., less than one wavelength). Hence, it is particularly important to mitigate this effect in a near-field system.

The localized heating effect can be indicated by the signal detected by the detection module 108 in the system 100 of FIG. 1. It has been found that the distortion in the signal detected by the detection module 108 shows a dependence on the power of the light source 102 when the power is above a threshold.

Figure 2A:
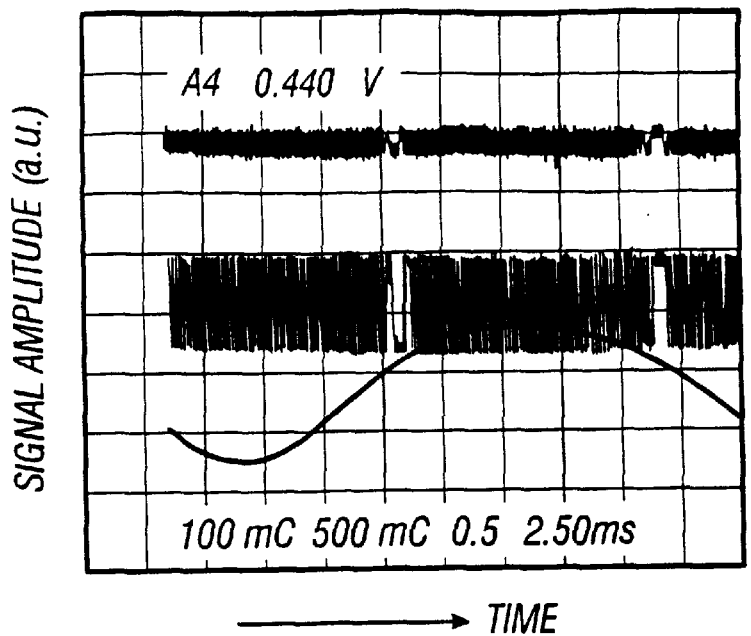
FIGS. 2A and 2B are plots of measured data showing the effect of the laser power dependent signal in the near-field system shown in FIG. 1.
Figure 2B:
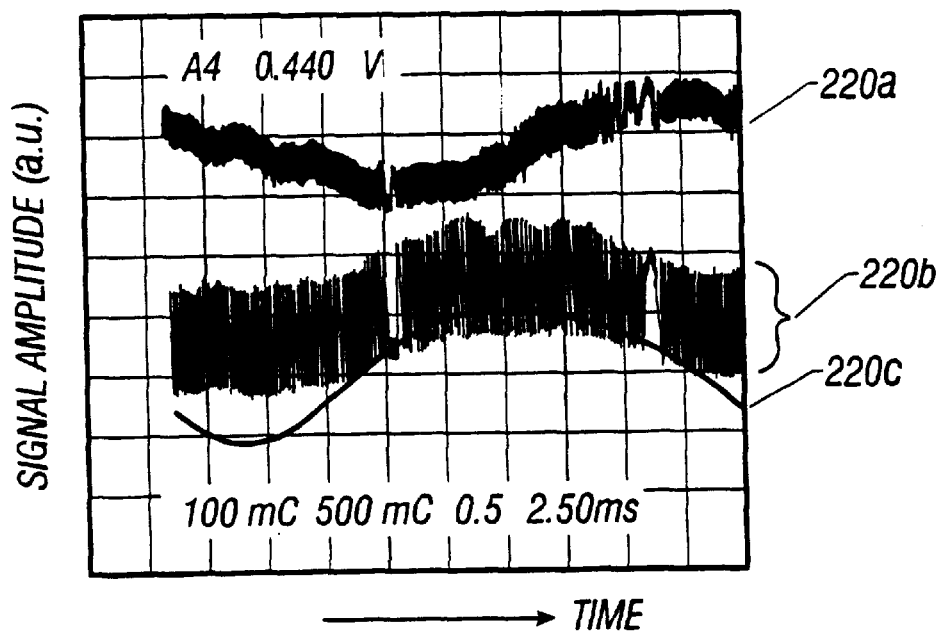

FIGS. 2A and 2B are charts of measured data showing this effect. A system similar to the system 100 in FIG. 1 was used to obtain the data in FIGS. 2A and 2B. A diode laser was used as the light source 102. The driving current injected into the diode laser can be used to represent the laser power. The optical medium 150 is a multilayer magneto-optical ("MO") disk having a structure as follows:

Top dielectric/MO/SiN/Al/Substrate, in which the top dielectric layer is about 30 to 50 nm thick, the MO layer is about 20 to 30 nm thick, the SiN layer is about 10 to 20 nm thick, and the aluminum reflecting layer is about 50 to 60 nm. The substrate is formed of a plastic and is about 2 mm thick.

When the diode laser was driven at a low current of about 58.1 mA, the properties of the head/medium interface are not significantly changed. Thus, signals received by the detection module 108 remain substantially constant. FIG. 2A shows three traces as a function of time at the low current. The top trace 210a is an alignment error signal ("AES") indicating the beam offset along a track direction and used for aligning/mounting the optical head, the center trace 210b is the normalized tracking error signal ("NTES") indicating the beam offset across a track and used for tracking the beam, and the bottom trace 210c is a laser Doppler signal representing the variation in the axial position of the disk during operation relative to the diode laser. The AES and NTES signals are typically generated by a quadrant detector in the detection module 108. The measured data indicates that, at the laser power corresponding to the driving current of 58.1 mA, the DC levels of the AES 210a and the NTES 210b essentially remain constant, uniform and undistorted (i.e., a constant DC level).

As the driving current to the diode laser increases to 60.8 mA, the AES and NTES become distorted and the DC levels of the AES and the NTES vary with the laser Doppler signal. This is shown in FIG. 2B in which traces 220a, 220b, and 220c represent the AES, the NTES, and the laser Doppler signal, respectively. Additional measurements indicate that such signal variation is dependent on the laser power. When the laser power is below a threshold value which corresponds to a driving current of 59.3 mA, the effect of the signal variation becomes essentially negligible.

The signal variation due to the laser power will be referred to as laser power dependent signal ("LAPD") phenomena in the following description. This is undesirable and should be minimized if possible. A variation in the NTES and AES caused by the LAPD may falsely indicate that an on-track beam is mis-aligned with the track and marks being read or written are off the center of the track. In general, any feedback signal passing through the interface between the optical head and the medium is adversely affected by the LAPD, leading to track misregistration or data jitter.

One way to mitigate this problem is to maintain the laser power under the LAPD threshold. However, the laser power cannot be too low because a certain minimum power level is required to achieve a desired signal-to-noise ratio during data readout and to write data in the recording layer (e.g., a MO layer or a phase-changing layer) during recording.

A more preferred solution to the problem is to increase the threshold for the laser power dependent variation of optical signals so that the laser power can be increased to achieve a desired signal-to-noise ratio but is still kept under the LAPD threshold.

In recognition of the above, a multilayer structure of the optical medium is disclosed to reduce or substantially minimize the heat transfer from the recording layer to the interface of the optical medium and the optical head. This reduces the temperature change at the surface of the medium close to the optical head and in effect increases the LAPD threshold.

One embodiment of the multilayer structure of the optical medium includes one or more special power-mitigating layers to reduce thermal coupling between the optical head and the recording layer. A power-mitigating layer may be implemented in at least two different configurations. One configuration uses a special capping layer formed of a material with a low thermal conductivity and disposed between the optical head and the recording layer to provide thermal insulation between the optical head and the recording layer in the medium.

Another configuration of the power-mitigating layer is a highly thermally conductive layer disposed to conduct the generated heat in the recording layer away from the interface of the optical head and the medium. These two types of power-mitigating layers may be used either individually or in combination.

One or more special capping layers may be formed between the optical head and the recording layer. These capping layers have properties to thermally insulate the optical head from the recording layer. A capping layer may be formed of a thick and optically transparent material with a low thermal conductivity in order to reduce the thermal feedback from the medium to the optical head caused by the localized heating. A material comprising at least one of a diamond-like-carbon ("DLC") material, silicon nitride or oxide materials, titanium dioxide, zirconium dioxide and others, for example, can be used.

A capping layer may be characterized by finding a ratio between the thickness of the capping layer and the respective thermal conductivity. In general, this ratio should be sufficiently large to provide desired thermal insulation. For example, a suitable capping layer may be configured to have a thickness-to-conductivity ratio greater than about $10^3$ nm·(J/cm·s·° C.)$^{-1}$, and preferably greater than about $2 \times 10^3$ nm·(J/cm·s·° C.)$^{-1}$, and more preferably greater than $14 \times 10^3$ nm·(J/cm·s·° C.)$^{-1}$.

The above ratio may be modified to include the effect of optical absorption by multiplying the inverse of the absorption coefficient of the capping layer. The dielectric constant of a dielectric material can be generally expressed as (ik+n) where the imaginary part k is the extinction coefficient representing the optical absorption of the material and n is the index of refraction. It is desirable to have low extinction coefficients in the dielectric layers disposed between the recording layer and the optical head. The absorption for a capping layer should be as small as possible. This increases the LAPD threshold.

Figure 3A:
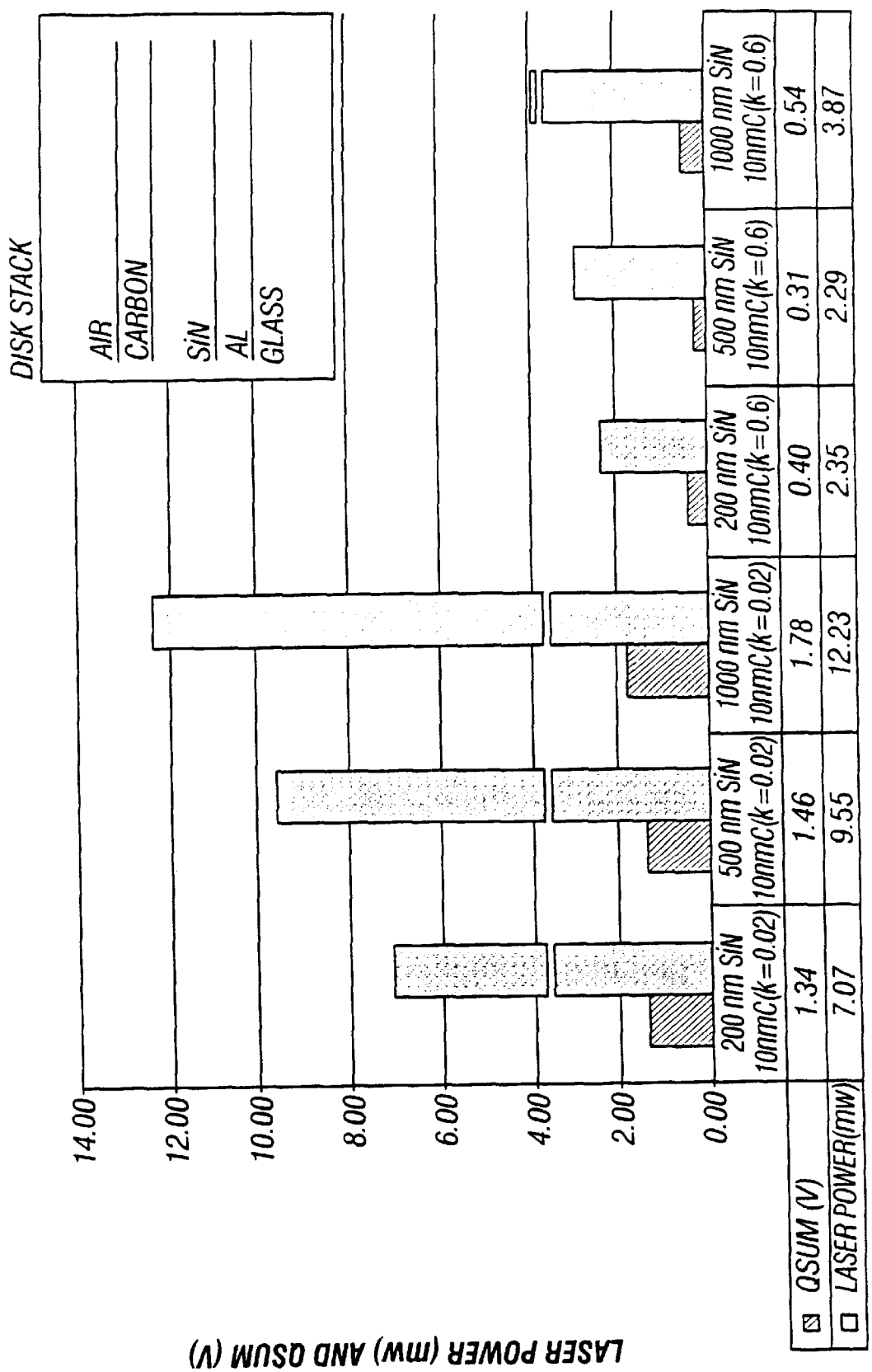
FIG. 3A is a chart showing the effect of a SiN capping layer formed on several glass substrate disks.
Figure 3B:
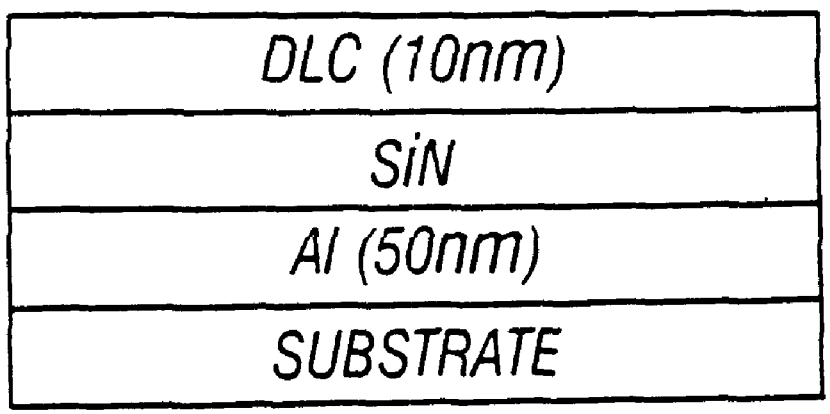
FIG. 3B is a diagram illustrating the structure of the disks with a capping layer that are used to obtain data in FIG. 3A.

FIG. 3A is a chart showing the effect of a SiN capping layer formed on several glass substrate disks with the following structure as shown in FIG. 3B:

Substrate/Al(50 nm)/SiN (varying thickness)/DLC(10 nm), where the DLC layer serves both as a protection layer and an additional capping layer. The glass disks under test have SiN capping layers with three different thicknesses at 200 nm, 500 nm, and 1000 nm and DLCs with two different extinction coefficients, a low k of about 0.02 and a high k of about 0.67. The measured data in FIG. 3 indicates that the LAPD threshold is the highest for the disk with a SiN capping layer of 1000 nm thick and the DLC layer with a low k and is the lowest for the disk with a SiN capping layer of 200 nm thick and the DLC layer with a high k.

Two effects of the capping layers on the LAPD threshold are evident in FIG. 3A. First, the LAPD increases as the thickness of the SiN capping layer increases. Second, LAPD threshold is strongly affected by the extinction coefficient k of the top DLC layer: the LAPD threshold increases as k decreases. Thus, it is desirable to increase the thermal insulation of the dielectric layers atop the recording layer (e.g., SiN/DLC) by increasing the thickness and reducing the thermal conduction in order to increase the LAPD threshold.

Table 1 lists calculated temperature change and measured LAPD threshold for various multilayer structures having silicon dioxide and silicon nitride capping layers. These multilayer structures each include a plastic substrate, a 60-nm underlayer of AlCr as a reflector, a 20-nm MO recording layer, a capping layer of SiO$_2$ or SiN, and a DLC layer. The calculations are based on a combination of a thermal model "TEMPROFILE" and an optical model for a multilayer medium "DIFFRACT", both developed by M. Mansuripur of University of Arizona. See, for example, Applied Optics, Vol. 21, p. 666 (1983) and Journal of Optical Society of America A, Vol. 6(5), June, 1989, which are incorporated herein by reference. Such a combination can include the effects of the optical near-field configuration.

In particular, the DIFFRACT is used to calculate the optical response including the absorption of a medium with and without a SIL lens. The difference in the calculated absorption between the two models can be used to scale the laser power into TEMPROFILE. For example, assume the reflectivity of a multilayer film is 0.2 without the SIL and 0.5 with the SIL. Thus, the presence of the SIL reduces the absorption by 0.3. Therefore, to model a 1 mW input power to the optical head, the power value for TEMPROFILE should be 1−0.3=0.7 mW to account for the SIL.

The results shown in Table 1 indicate that thicker SiN layers can be more effective as capping layers, owing to their thermal insulating ability, to increase the LAPD threshold.

TABLE 1

| Stack | Reflectivity w/o SIL | Reflectivity w/ SIL | Adj. Input Power (mW) | Max. Temp Rise (° C.) | LAPD (mV) |
|---|---|---|---|---|---|
| Variation of SiO$_2$ thickness | | | | | |
| PC(THOM)AlCr(60)MO(20)SiO$_2$(80)DLC(20) | 0.41 | 0.42 | 0.99 | 32.6 | 66 |
| PC(THOM)AlCr(60)MO(20)SiO$_2$(110)DLC(20) | 0.48 | 0.409 | 1.071 | 28 | 128 |
| PC(THOM)AlCr(60)MO(20)SiO$_2$(140)DLC(20) | 0.637 | 0.506 | 1.131 | 17.9 | 184 |
| Variation of SiN Thickness | | | | | |
| PC(THOM)AlCr(60)MO(20)SiN(30)DLC(30) | 0.212 | 0.517 | 0.695 | 35.3 | 58 |
| PC(THOM)AlCr(60)MO(20)SiN(50)DLC(30) | 0.17 | 0.351 | 0.819 | 40.6 | 48 |
| PC(THOM)AlCr(60)MO(20)SiN(70)DLC(30) | 0.337 | 0.253 | 1.084 | 40 | 55 |
| PC(THOM)AlCr(60)MO(20)SiN(100)DLC(30) | 0.559 | 0.454 | 1.105 | 25 | 68 |
| PC(THOM)AlCr(60)MO(20)SiN(160)DLC(30) | 0.562 | 0.684 | 0.878 | 17.7 | 108 |
| PC(THOM)AlCr(60)MO(20)SiN(190)DLC(30) | 0.345 | 0.617 | 0.728 | 20.7 | 95 |
| PC(THOM)AlCr(60)MO(20)SiN(210)DLC(30) | 0.179 | 0.496 | 0.683 | 22.2 | 103 |

The LAPD threshold and the surface temperature of a multilayer thin film structure have a correspondence with respect to each other. In general, as the surface temperature rise caused by laser heating decreases, the LAPD threshold increases and vice versa. This has been established both by measurements and the above-mentioned thermal modeling.

Figure 4:
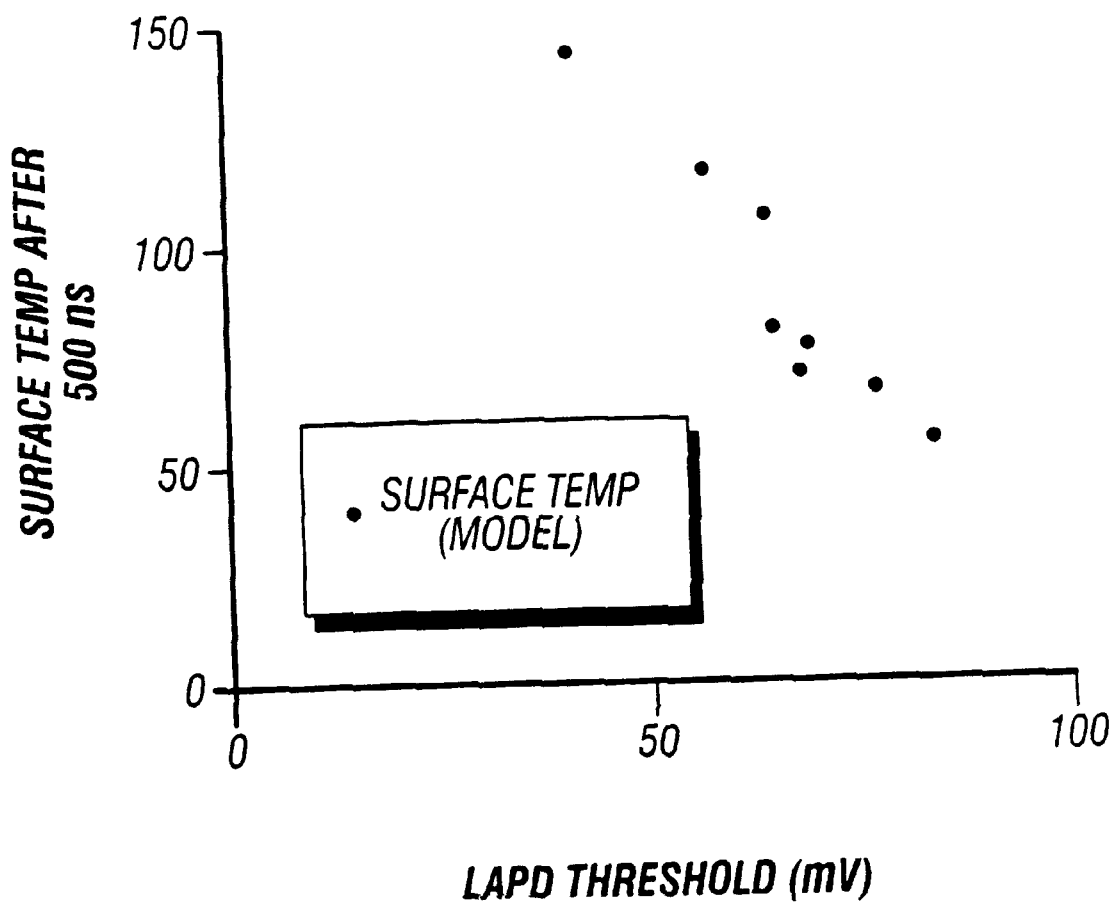
FIG. 4 is a chart showing the correlation between measured threshold values of the laser power dependent signal and calculated surface temperature rise after 500 ns of laser illumination of 1 mW for various stacks of different underlayers and thermal conductivities.
Figure 5A:
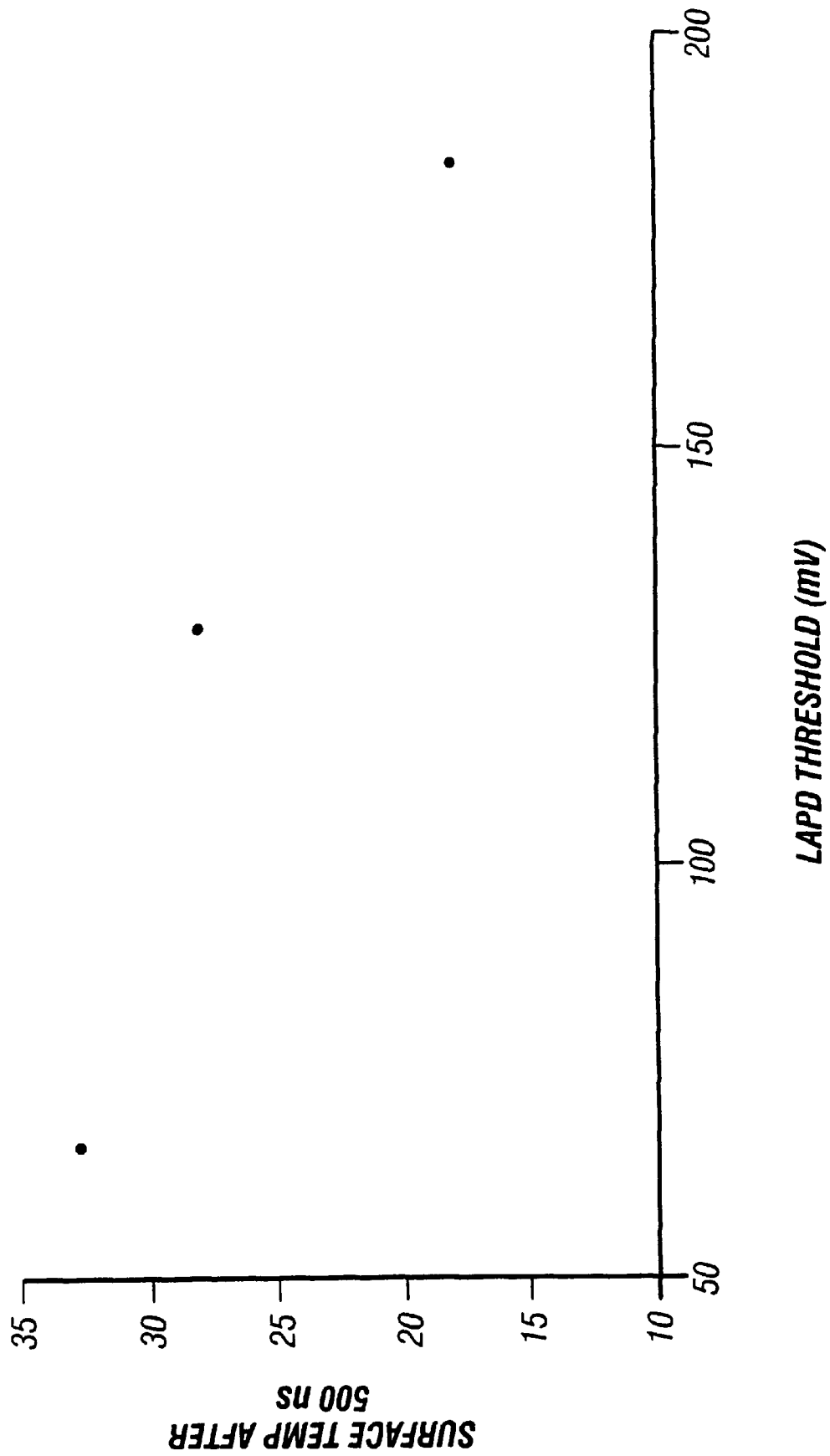
FIGS. 5A and 5B are charts showing the correlation between measured threshold values for the laser power dependent signal and calculated surface temperature rise after 500 ns of laser illumination of 1 mW for $SiO_2$ and SiN stacks, respectively.
Figure 5B:
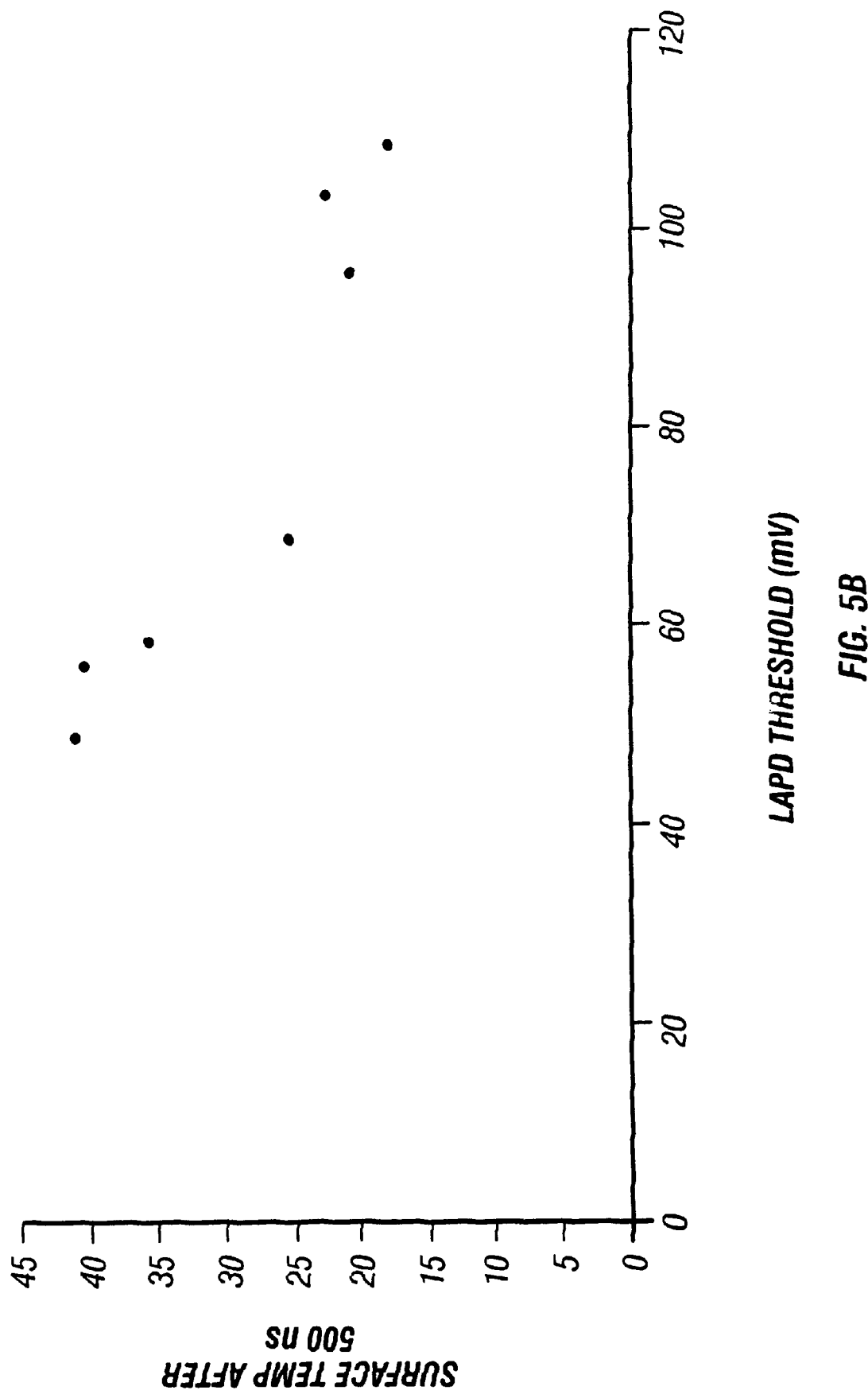

FIG. 4 shows the correlation between measured LAPD threshold power values and calculated surface temperature rise after 500 ns of laser illumination of 1 mW for various stacks. The values of the LAPD threshold are represented by voltages from a power detector that measures the output power of the diode laser (i.e., light source 102 in FIG. 1). FIGS. 5A and 5B further show the above correlation for SiO$_2$ and SiN stacks, respectively.

A power-mitigating layer for conducting the heat away from the interface of the optical head and the medium may be a highly thermally conductive layer placed between the recording layer and the optical head so that the thermal feedback to the optical head can be reduced by laterally dissipating the heat. Since such a thermally conductive layer is formed in the path of a read/write beam, the material should be optically transparent at the operating wavelength. Dielectric materials and/or thin metallic layers (e.g., less than 10 nm thick) may be used for this purpose. A layer of aluminum nitride, for example, can be configured to have a thermal conductivity of about 5 to 7 times greater than that of a SiN layer and hence can be used to form such a transparent dielectric layer. For thin transparent metallic layers, suitable materials may include Ag, Au, or other metals.

Another way of implementing a thermally conductive power-mitigating layer is on the other side of the recording layer away from the optical head. Such a power-mitigating layer reduces the amount of heat to the optical head side of the recording layer. Such a layer does not have to be optically transparent and in general can be any material that has a high thermal conductivity, such as Ag, Au, Cu, Al, etc. The reflector layer under the recording layer, for example, can be configured to have a high thermal conductivity to function as a conductive power-mitigating layer. In one implementation, the thermal conductivity of the reflector layer may be higher than that of the layers above the recording layer in order to extract a significant portion of the heat generated in the recording layer.

The above two ways of forming thermally conductive power-mitigating layers can be used individually or in combination depending on the specific requirements of an application.

Figure 6:
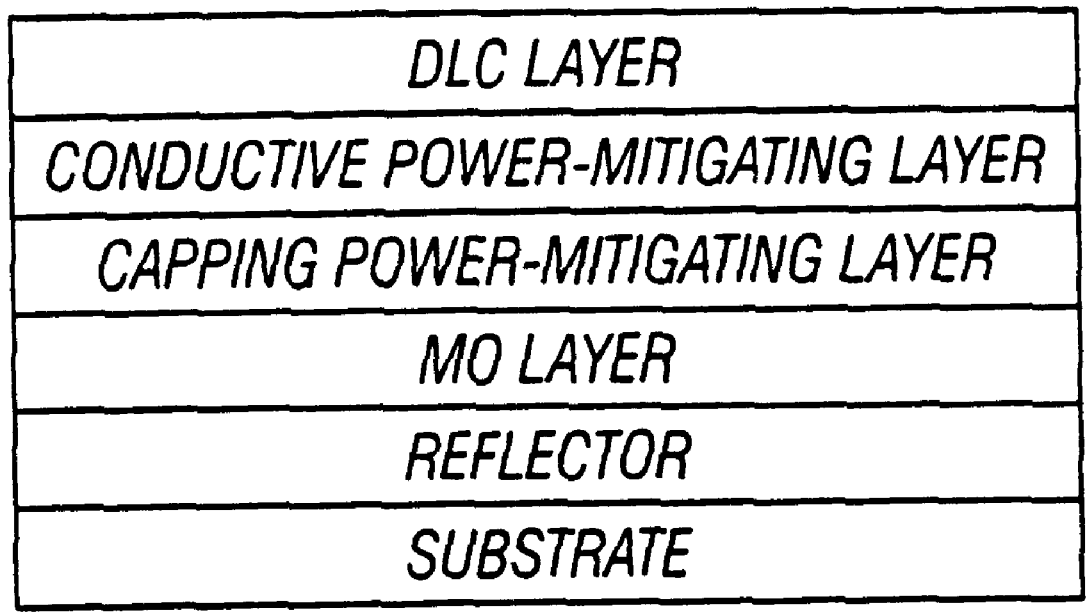
FIG. 6 is a diagram showing a multilayer optical medium having two different power-mitigating layers: a capping layer and a thermal conductive layer.

Moreover, a capping layer and a thermally conductive layer can be combined in a multilayer medium to increase the LAPD threshold. For example, such a combination may be used to form the following multilayer structure:

Substrate/Reflector/MO/Capping layer/Thin metal/DLC,
where the thin metal layer is a conductive power-mitigating layer and is optically transparent. Alternatively, the thin metal layer may be substitute by a transparent dielectric layer as the conductive power-mitigating layer. In addition, the reflector layer may be formed of a highly conductive layer to serve as an additional conductive power-mitigating layer. This is illustrated in FIG. 6.

Multilayer stacks with different underlayers and capping layers have been used to investigate the effect of the thermal conductivity of an underlayer. The following two stack structures have been tested:

Stack 1: APO/AlTi(50)/MO(20)/SiN(40)/DLC(10); and

Stack 2: APO/AlTi(50)/SiN(20)/MO(20)/SiN(120)DLC (10), in which APO is an amorphous poly-olefin (a plastic) substrate and AlTi is the underlayer that is optically reflective. The content of Ti can be varied to change the thermal conductivity of the 50-nm thick AlTi underlayer. Table 2 shows the measured thermal conductivities for different Ti contents. The thermal conductivity increases as the Ti content decreases.

TABLE 2

| % Ti | K(W/cm ° C.) |
|---|---|
| 2 | 0.40 |
| 7 | 0.18 |
| 10 | 0.13 |
| 25 | 0.05 |

Figure 7A:
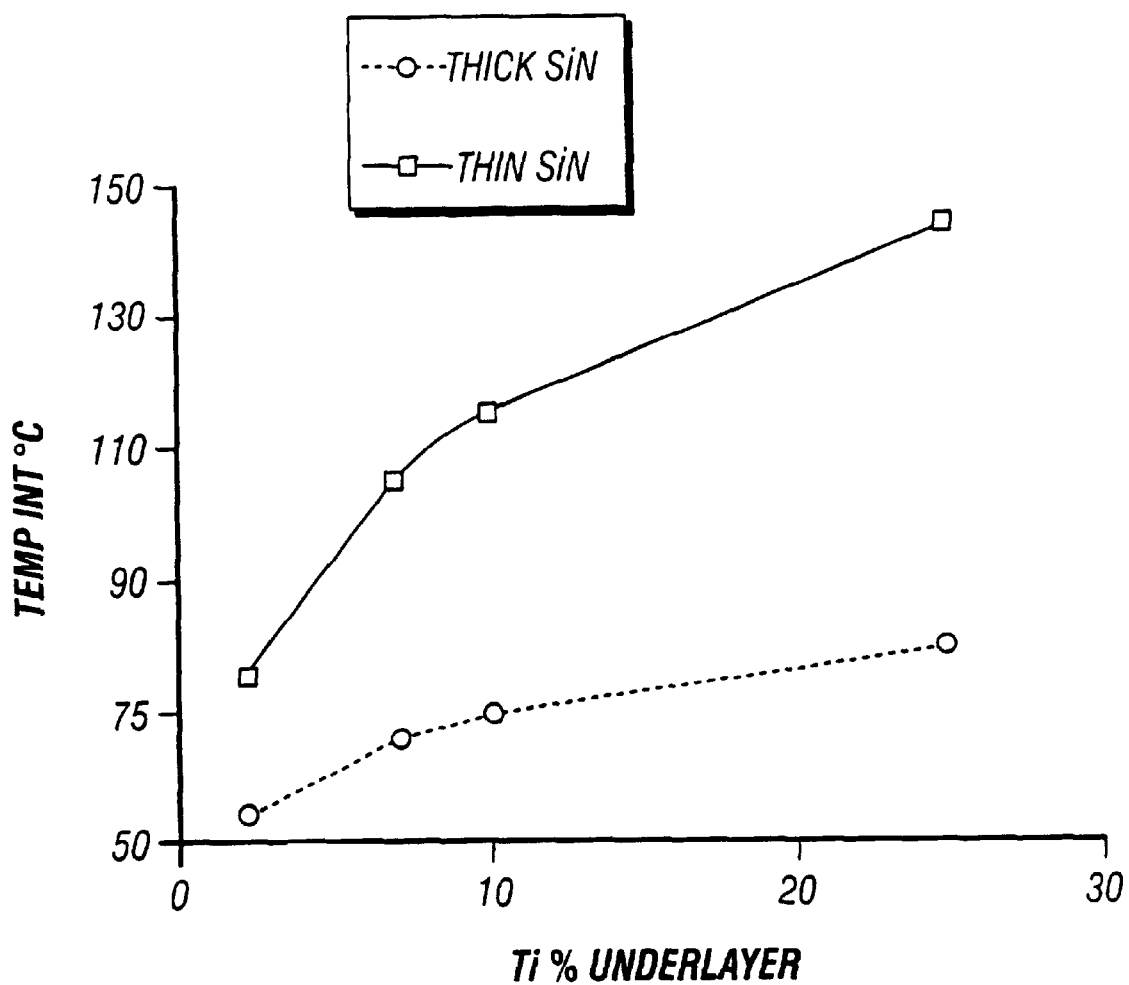
FIG. 7A is a chart showing the calculated surface temperatures after 500 ns of illumination of a laser beam at 1 mW for various disks having a magneto-optical ("MO") recording layer based on a stack of APO/AlTi(50)/MO(20)/SiN(40)/DLC(10) and another stack of APO/AlTi(50)/SiN(20)/MO(20)/SiN(120)DLC(10).

FIG. 7A shows the calculated surface temperatures after 500 ns of illumination of a laser beam at 1 mW for various disks based on the stack 1 with a thin SiN capping layer and stack 2 with a thick SiN capping layer. The surface temperature reduces as the content of the Ti decreases.

Figure 7B:
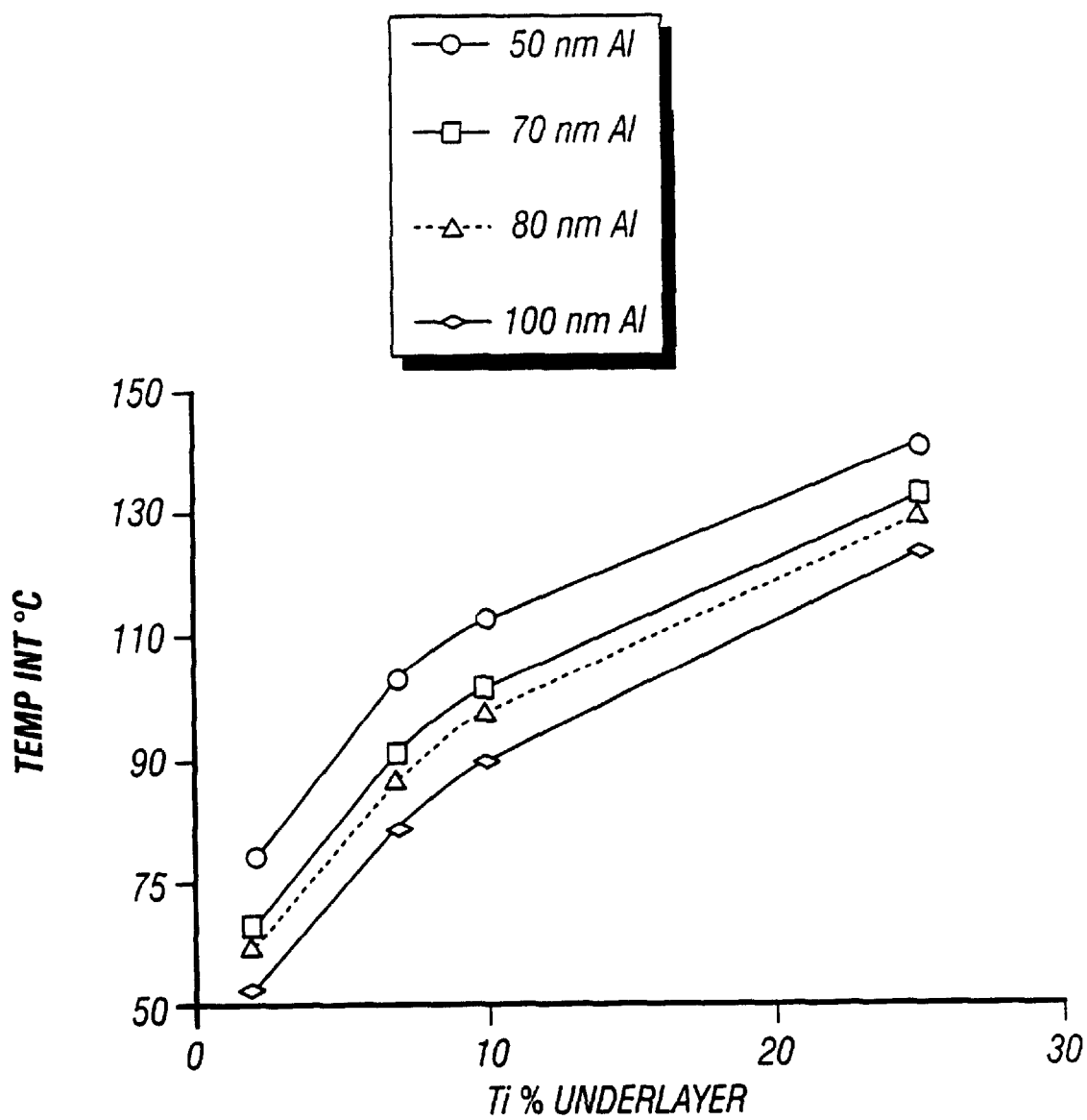
FIG. 7B is a chart showing the calculated surface temperature after 500 ns of illumination of laser power at 1 mW for a multilayer stack having a structure of APO/AlTi/MO (20)/SiN(40)/DLC(10) with different Ti content and different thickness values of the AlTi underlayer.

The thickness of a given underlayer can also affect the LAPD value, or equivalently the top surface temperature of a multilayer medium. FIG. 7B shows the calculated surface temperature after 500 ns of illumination of laser power at 1 mW for the above multilayer stack 1 with different Ti content and different thickness values of the AlTi underlayer.

The data indicates that the surface temperature reduces as the thickness of the AlTi underlayer increases. In addition, the effect of thermal conductivity of the underlayer on the surface temperature or the LAPD is more significant than that of the thickness of the underlayer.

Although the present invention has been described in detail with reference to the preferred embodiments, various modifications and enhancements may be made without departing from the spirit and scope of the invention. For example, various techniques described above may be combined to increase the LAPD threshold of a multilayer medium. Other materials that are different from what have been disclosed may be used to form a desired multilayer medium. Although a hemispherical SIL is used as an exemplary near-field lens, it should be understood that the same basic principles apply to other types of near-field lenses or other near-field optical elements such as a solid immersion mirror or a high-index material with a diffractive optical element (e.g., lens). See, Lee et al., "Feasibility study on near field optical memory using a catadioptric optical system," Optical Data Storage, 1998 Technical Digest Series, Vol. 8 and Japanese laid-open patent application No. 8-245053 by Hatakoshi et al., which are incorporated herein by reference. These and other variations are intended to be fully encompassed by the following claims.

What is claimed is:

1. A method of reducing a signal distortion caused by thermal feedback from an optical medium to an optical head in a near-field configuration, comprising:

providing at least one testing optical medium which has a recording layer over a substrate in an optical medium that is operable to interact with light to read or write data on said recording layer, and a reflective layer between said recording layer and said substrate of said optical medium to reflect back light transmitted through said recording layer, without transmission through said substrate, wherein said recording layer and said reflective layer are located between a medium surface which receives said light and said substrate, coupling light to said at least one testing optical medium in a near-field coupling configuration to determine a threshold input optical power above which a signal distortion caused by heat generated by absorption of said light in said recording layer towards said medium surface occurs; and forming an optical medium with a similar structure as said testing optical medium and includes a reflective layer between a substrate and a recording layer, where at least one power-mitigating layer is positioned relative to said recording layer between a medium surface and said substrate in said optical medium to mitigate conduction of heat generated by optical absorption in said recording layer towards said medium surface and said at least one power-mitigating layer is designed to make a threshold input optical power above which said signal distortion occurs greater than an input optical power level at which data can be written in or read from said recording layer or the testing optical medium.

2. A method as in claim 1, wherein said at least one power-mitigating layer is thermally insulating so as to reduce said conduction of said heat towards said medium surface, wherein said at least one power-mitigating layer is optically transparent to said light and is disposed in said optical medium between said medium surface and said recording layer.

3. A method as in claim 2, wherein said power-mitigating layer includes a dielectric layer of predetermined thickness and low thermal conductivity.

4. A method as in claim 3, wherein said dielectric layer is configured to have a ratio of said thickness over said thermal conductivity greater than about $10^3$ nm·(J/cm·s·° C.)$^{-1}$.

5. A method as in claim 3, wherein said dielectric layer is formed of a material selected from silicon nitride, silicon dioxide, titanium dioxide or zirconium dioxide, or a diamond-like-carbon material.

6. A method as in claim 1, further comprising configuring said at least one power-mitigating layer to have a high thermal conductivity so as to conduct at least a portion of said heat away from said medium surface.

7. A method as in claim 6, wherein said power-mitigating layer is disposed between said medium surface and said recording layer.

8. A method as in claim 7, wherein said power-mitigating layer includes an aluminum nitride or a thin and optically transparent metallic film formed of Ag or Au.

9. A method as in claim 8, wherein said metallic film is less than 10 nm in thickness.

10. A method as in claim 6, wherein said power-mitigating layer is disposed between said recording layer and said substrate.

11. A method as in claim 6, wherein said power-mitigating layer is configured to conduct said portion of said heat laterally along said power-mitigating layer.

* * * * *